United States Patent
Dalton

(10) Patent No.: US 7,379,209 B1
(45) Date of Patent: May 27, 2008

(54) COLOR SEPARATION OF PATTERN COLOR SPACES AND FORM XOBJECTS

(75) Inventor: Michelle R. Dalton, Bainbridge Island, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 11/623,735

(22) Filed: Jan. 16, 2007

Related U.S. Application Data

(63) Continuation of application No. 09/499,249, filed on Feb. 7, 2000, now Pat. No. 7,164,494.

(51) Int. Cl.
*G06K 15/00* (2006.01)
*H04N 1/46* (2006.01)

(52) U.S. Cl. .................. 358/1.9; 358/515; 358/1.16

(58) Field of Classification Search ............... 358/1.9, 358/1.18, 1.1, 1.2, 1.8, 1.11, 1.15, 1.16, 1.3, 358/504, 517–520, 3.06, 3.1, 3.13, 534–536, 358/515
See application file for complete search history.

(56) References Cited

U.S. PATENT DOCUMENTS

| 5,126,795 A | 6/1992 | Maruyama et al. ......... 355/251 |
| 6,256,108 B1 | 7/2001 | Dziesietnik et al. ....... 358/1.18 |
| 6,429,949 B1 | 8/2002 | Dziesietnik et al. ....... 358/1.16 |
| 7,164,494 B1 * | 1/2007 | Dalton ....................... 358/1.9 |

* cited by examiner

*Primary Examiner*—Dov Popovici
(74) *Attorney, Agent, or Firm*—Fish & Richardson P.C.

(57) ABSTRACT

Systems and computer program products for performing color separation operations. In one aspect, a system creates a high-level representation of a graphical container as a separated element the first time a graphical container is used. The high-level representation being a non-bitmapped representation. The system stores the high-level representation of the graphical container in memory and refers to the separated element in memory when the graphical container is invoked a second time. In another aspect, a system creates a high-level representation of a form XObject as a separated element in a cache. The system uses the separated element in the cache when the form XObject is invoked a second time. In another aspect, a system creates a high-level representation of a pattern container as a separated element in the cache and uses the separated element in the cache when the pattern container is invoked a second time.

6 Claims, 6 Drawing Sheets

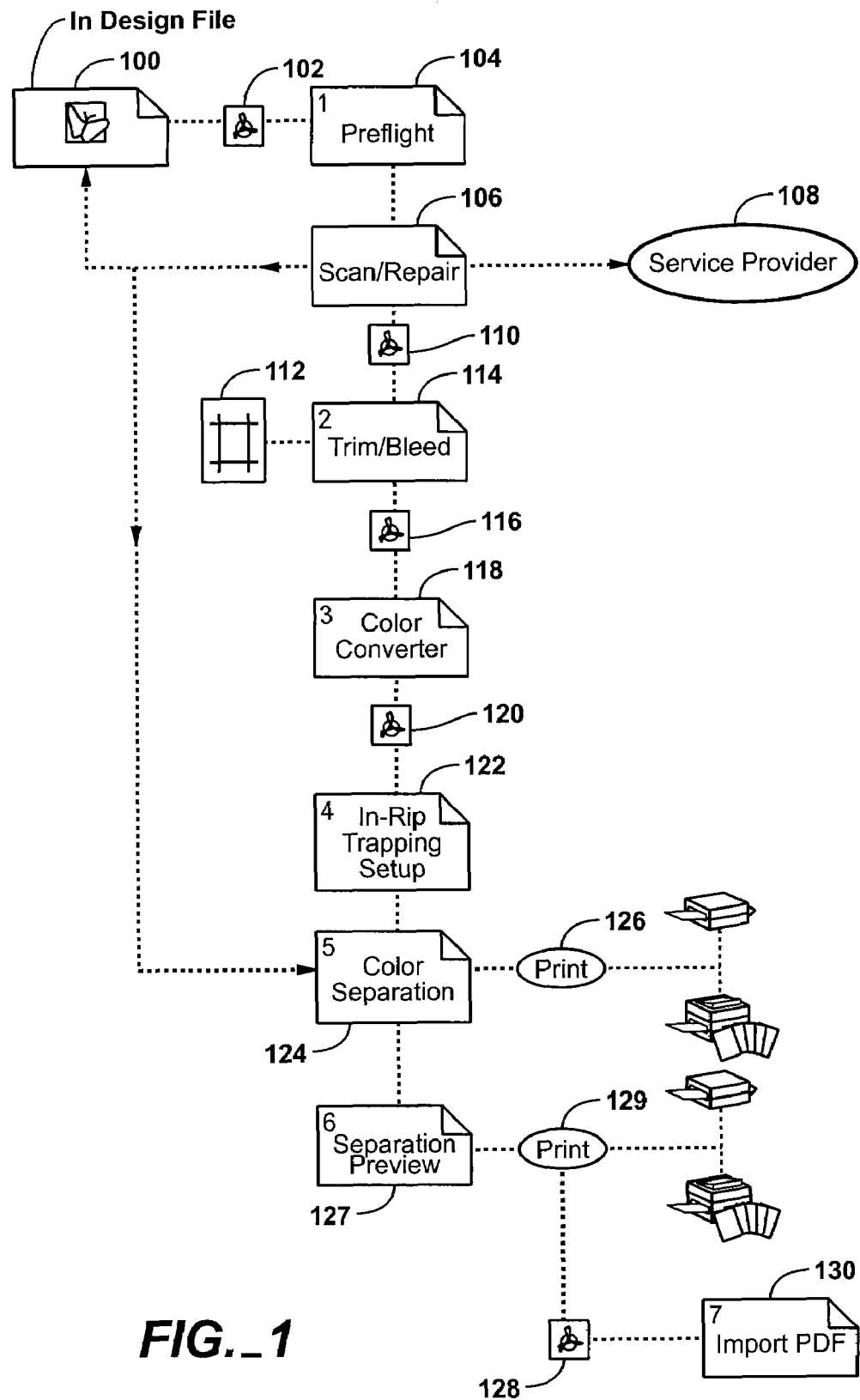
FIG._1

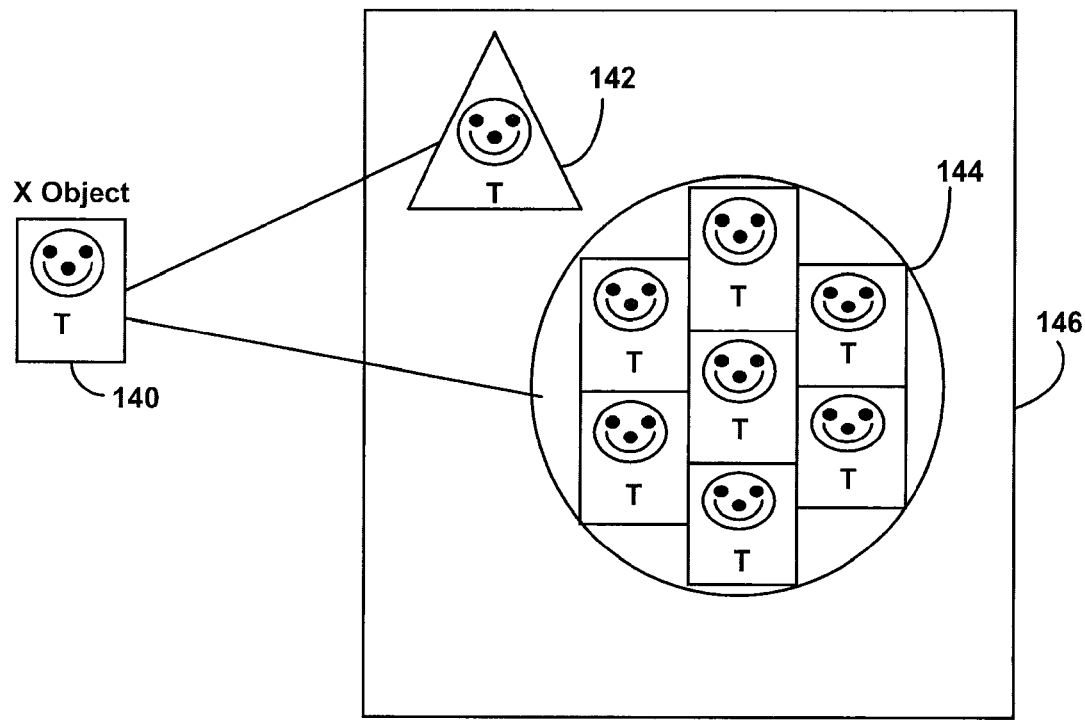
FIG._2
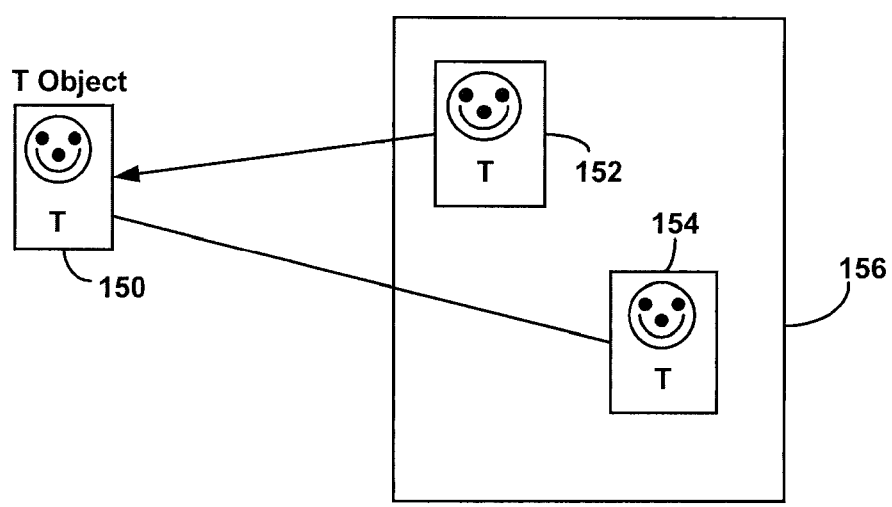
FIG._3

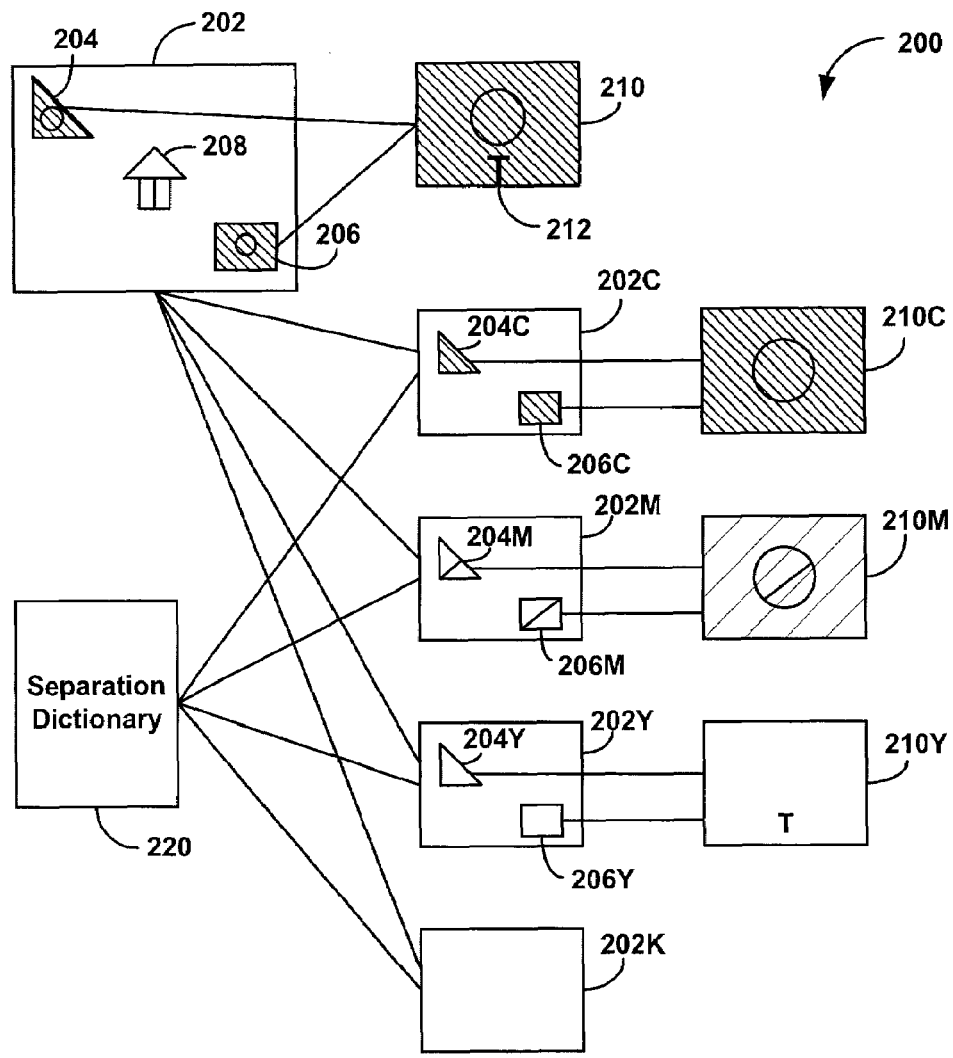
FIG._4

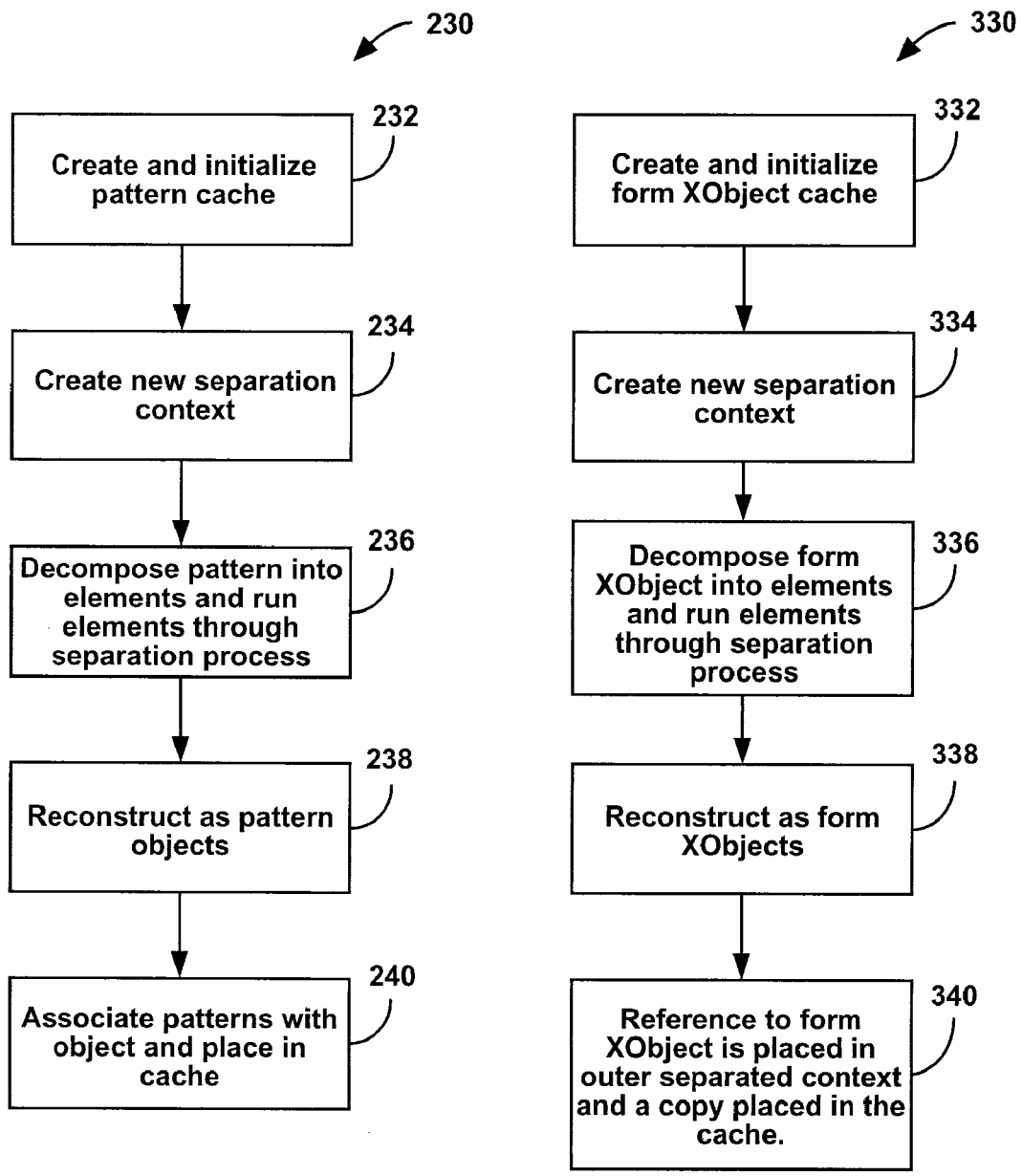
FIG._5
FIG._6

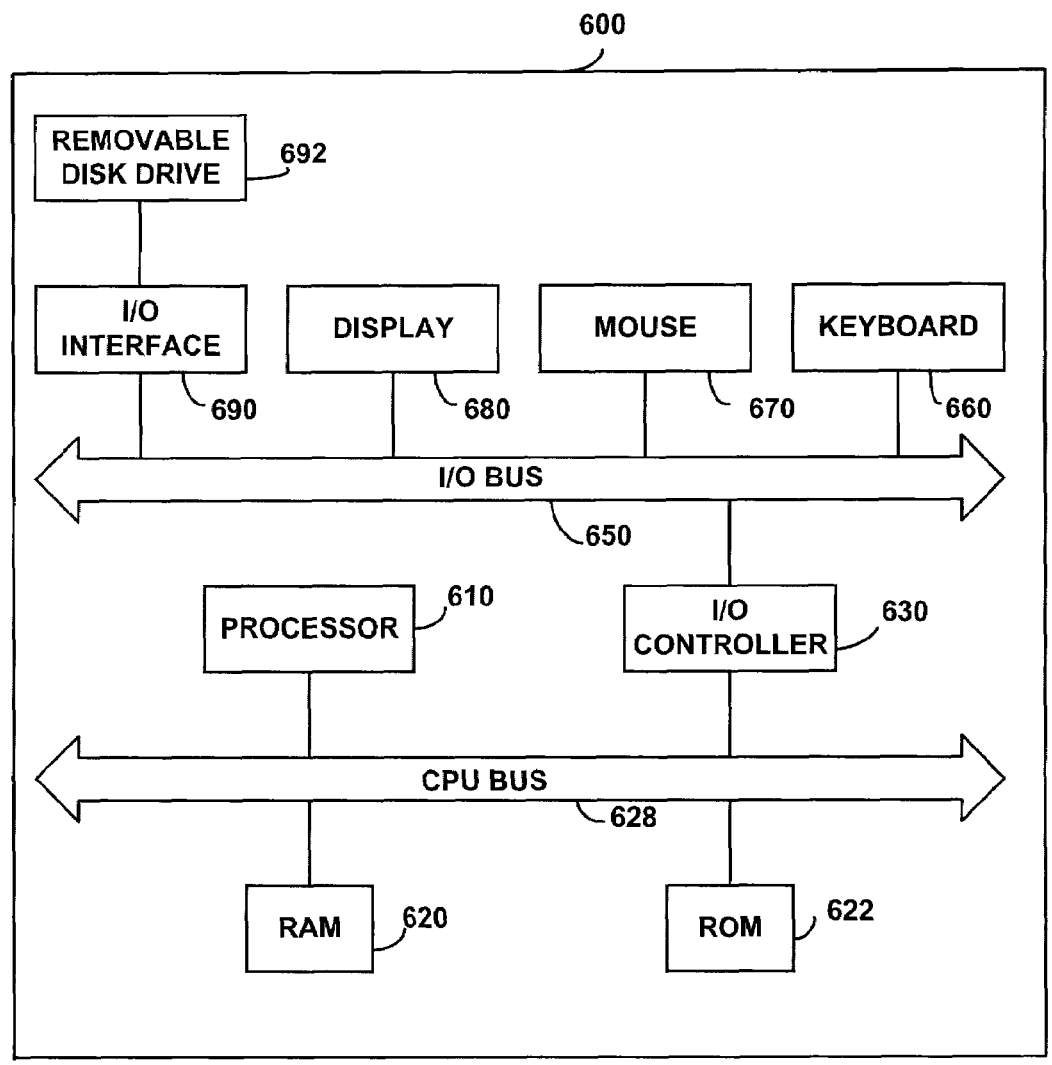
FIG._7

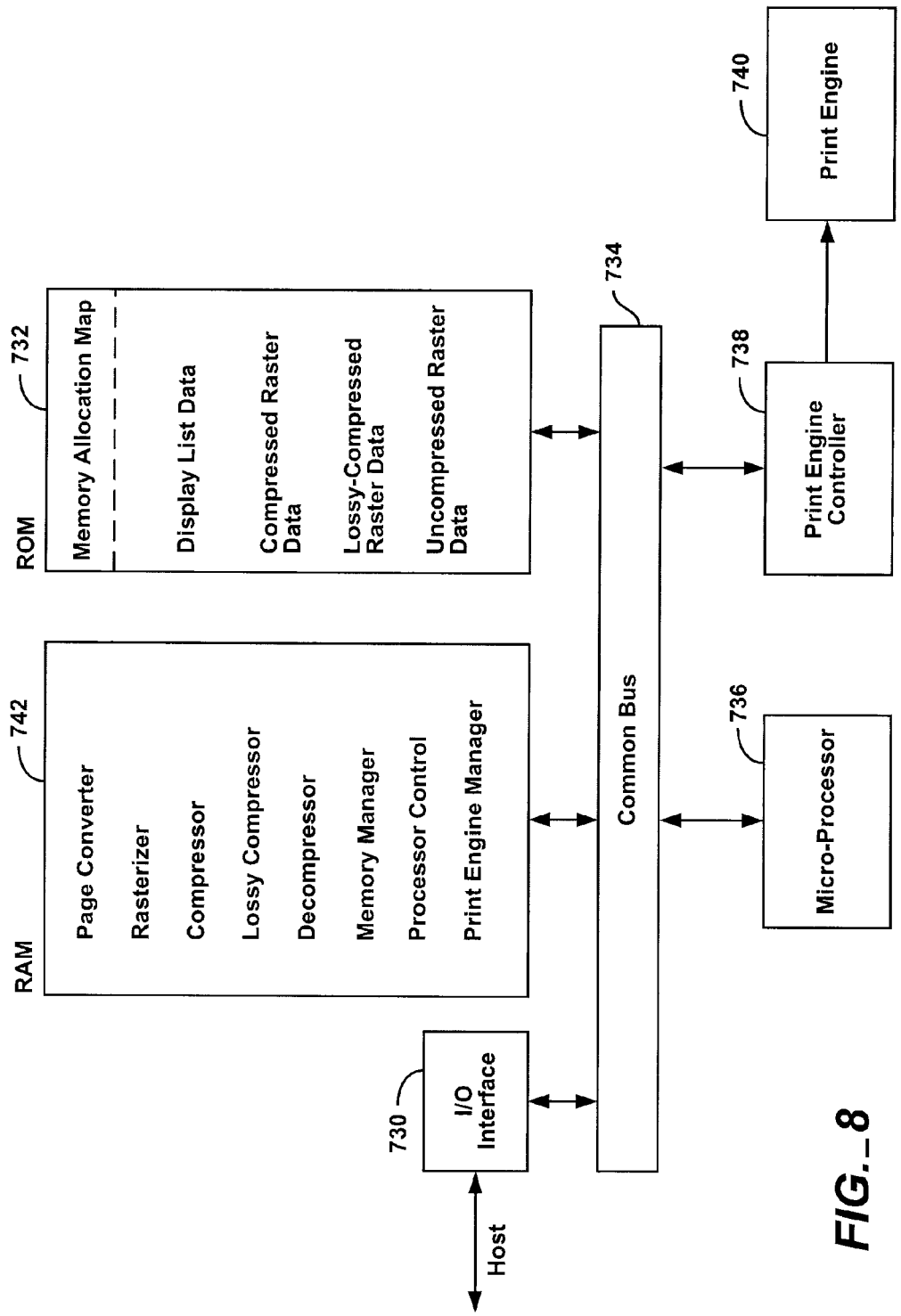
FIG._8

COLOR SEPARATION OF PATTERN COLOR SPACES AND FORM XOBJECTS

CROSS-REFERENCE TO RELATED APPLICATIONS

This application is a continuation application of, and claims priority to, U.S. patent application Ser. No. 09/499,249, entitled COLOR SEPARATION OF PATTERN COLOR SPACES AND FORM XOBJECTS, to inventor Michelle R. Dalton, which was filed on Feb. 7, 2000 (now U.S. Pat. No. 7,164,494, issued Jan. 16, 2007). The disclosure of the above application is incorporated herein by reference in its entirety.

BACKGROUND

The present disclosure relates to methods and systems for performing color separation.

Color printing has traditionally required the integration of many unique and varied talents to see a project through from conception to a printed page. Prior to the advent of "desktop publishing," ideas or concepts were typically first drawn by hand and photographed, any text or illustrations added, and the aggregate of pictures and text used to produce a printed page. The traditional process generally required, in addition to design personnel, a paste-up person, typesetting bureau and a lithography department that would produce separations from the photographs. Desktop publishing has relieved some of the burden of publishers by allowing color production, i.e., drawing and layout, to be integrated electronically using personal computers. Color documents can now be designed, enhanced, color-corrected, and separated on a desktop computer.

The computer can output data to a wide variety of output devices. Output devices such as laser printers, plotters, image-setters, and other printing devices produce an image or "visual representation" on a sheet of paper, a printing plate or the like. A printing device can print dots on a piece of paper corresponding to the information of a bitmap or pixelmap (where a pixelmap is characterized as having a depth of two or more bits). A "raster" printing device creates a visual representation by printing an array of pixels arranged in rows and columns from the bitmap.

A desktop printer uses toner to produce the colors comprising a color publication. Because composite printing is generally efficient only for small quantity jobs, larger quantities of the same publication are generally reproduced on a commercial printing press using ink. The printing press advantageously prints multiple pages of printed matter at the same time onto a single sheet. Other devices used for printing multiple pages at the same time include image setters and plate setters.

Methods of printing color publications using a commercial printer press include process-color printing, spot-color printing, or a combination of the two. Process-color printing separates the original image into its cyan (C), magenta (M), yellow (Y), and black (K) components to recreate the original shadings of color in the publication. This is accomplished by printing dots of the process-color inks in different combinations in close proximity to simulate a variety of colors on a printed page. Spot-color printing involves printing one or more specific colors (or inks) that have been specified according to a color matching system. One popular color matching system is the PANTONE MATCHING SYSTEM by Pantone, Inc. Spot-color printing is often used to produce colors that are not easily produced using CMYK inks, such as silver, gold, and fluorescent colors. Spot-color printing is also used in lieu of printing the four process colors, such as when only a few types of inks are required for a particular publication.

Before a color publication can be reproduced on a commercial printing press, each page containing composite art must be separated into its component colors by printing a separation for each ink (cyan, magenta, yellow, and black, if process colors are to be printed) and any spot colors. Spot-color printing requires a separation for each color being printed. A commercial printer uses film separations to create the printing plates used on the press. For instance, if one specifies the four process colors and a single spot color in a publication, there will be five separations, and hence printing plates, for each page. A separate component ink is added by each plate as the pages in the publication pass through the press. A more detailed explanation of the commercial printing process is discussed in the Commercial Printing Guide from PageMaker, Version 5.0. For additional information on desktop publishing generally, see Desktop Publishing in Color by Michael Kieran, published by Bantam Books (1991).

The printing devices typically produce output in response to a page description language (PDL) input. The PDL is a high level language for describing objects to be displayed by an output device. A printing device may receive page description data in the form of a PDL file. In order to produce a finished sheet, a printing device typically interprets all of the objects contained in the PDL file. Thereafter, the printing device renders objects within the data into bitmaps and prints the sheet. Depending on the printing device, printing of a band may begin as soon as the objects within that band are rendered. Alternatively, printing may not begin until all of the objects for the sheet have been rendered.

One popular PDL is called PDF (Portable Document Format) which was originally created by Adobe Systems Incorporated (San Jose, Calif.) as a way of electronically exchanging and reviewing documents. The PDF format retains the original color and style of any printable document and allows it to be viewed on any computer platform, including mainframes, servers, workstations, and personal computers. This format has become widely accepted as a standard for viewing on-line documents in their original format, without the restrictions of standard web pages.

A PDF file contains a PDF document and other supporting data. The PDF document contains one or more pages. Each page in the document may contain any combination of text, graphics, and images in a device- and resolution-independent format. This is the page description. A PDF document may also contain information possible only in an electronic representation, such as hypertext links, sound, and movies. In addition to a document, a PDF file contains the version of the PDF specification used in the file and information about the location of important structures in the file.

A PDF page content stream contains objects with color information. For example, each PDF object has a fill and a stroke color associated with the object and any of these colors may be defined as a colored pattern associated with the object. The pattern contains color information as part of the pattern description. Color information about objects is represented in a composite manner, i.e., the objects (as filled in by the patterns) contain a composite color information for the object. The pattern itself does not fully describe the object it is associated with. For example, the geometry of the object is not described by the pattern.

PDF defines a type of color known as a pattern, discussed on page 287 of the Adobe Portable Document Format Reference Manual version 1.3 (Mar. 11, 1999). There are two major types of patterns in PDF. The first type is called a tiling pattern; the second is called a smooth shading pattern. Tiling patterns are procedural; they include a sequence of explicit marking instructions, which are repeated once per tile. Smooth shading patterns are declarative; they include a description of the desired effect in terms of transitions between colors across a certain area. Like forms, patterns can contain sequences of marking operations; they are the same as patterns in the PostScript language. The space in which a pattern is defined is pattern space. The transformation from pattern space to user space is specified by a matrix contained in the pattern.

In addition to patterns, PDF supports named resources such as XObjects. PDF supports three types of XObjects: images, forms, and pass-through PostScript language fragments, among others. A form is a self-contained description of any text, graphics, or sampled images that may be drawn on several pages or more than once on a single page. A Form XObject is specified by a PDF stream, which is a contents stream.

Due to the popularity of the PDF format, it is desirable for printing devices to support the ability to directly print documents from a PDF file in various processes. These processes may vary from printing per plate, printing per spot color, among others. Moreover, certain printing processes require the separation of colors for each object as the object is drawn on zero or more of the plates. For example, given a four component color space (e.g. CMYK) and the existence of a color component for an object in each of the four color space, the object needs to be drawn up to four times, one time for each color component associated with a printing plate.

High-quality printing, such as that required by the publishing industry, poses many difficult problems in controlling the separations. For example, color printing is compromised if paper is not properly aligned as it makes multiple passes through the plates of a printer. Given the composite construct of a PDF document, the process of separating various components of a page to be printed in a given ink can be resource intensive and time consuming.

SUMMARY

In one aspect, a method optimizes a process for creating color separation for a document with a graphical container using a cache. The method includes creating a high-level representation of the container as a separated element in the cache; and using the separated element in the cache when the graphical container is invoked a second time. The container is a structure that relates one or more graphical elements and can be referenced as a single object. The high level representation is a non-bitmapped representation, for example a device independent representation or a vector representation, among others.

Implementations of the technique include one or more of the following. A separation context to capture one or more separated containers. Each container can be decomposed into one or more elements. Color separation can be performed for each element. The color separation for each element may be recursive. Each container can be reconstructed as an object. The reconstructed container can be reconstructed with a subsequent reference to an element. The reconstructed container can be referenced from the document. The object can be placed in the cache for each representation of a color plate. A cached representation of a component can be used in place of reprocessing the component if the cached representation exists.

In another aspect, a method optimizes a process for separating a document into one or more color layers by: for each color layer, determining whether a high-level representation of a graphical container exists in a cache; if a cache miss occurs, creating the representation of the graphical container and adding the representation of the graphical container to the cache; and if a cache hit occurs, referencing the representation of the graphical container in the cache.

In another aspect, a method generates a pre-separated file for color separation operations by creating a high-level representation of a graphical container as a separated element the first time the graphical container is used; storing the high level representation of the graphical container in memory; and referring to the separated element in memory when the graphical container is invoked a second time.

In another aspect, a pre-separated file includes a region for storing a high-level representation of a graphical container as a separated element the first time the graphical container is invoked; and a reference to the region each time the graphical container is subsequently invoked.

Implementations of the technique include one or more of the following. The file conforms to a Portable Document Format. The file can be viewed using a reader. The reader can display overprint data.

In one aspect, the system performs color separation on the basis of patterns or form XObjects. The system creates and caches each pattern/form XObject per color layer, paints the object on a per separated color pattern basis and reuses (due to caching) the pattern or form XObject for multiple objects on each printing plate. The caching also supports the reuse of the pattern or form XObject multiple times within a document.

Advantages of the systems and methods may include one or more of the following. The system minimizes latency when retrieving data for the patterns or form XObjects. The system also reduces the need to retrieve the patterns or form XObjects in the document and leads to a reduction in the level of data traffic. This increases the bandwidth available for other requests. Accessing data from the cache can be performed at extremely fast speeds. The efficiency of a cache system depends on how often the requested data can be found in the cache. If the requested data currently resides in the cache (i.e., a "hit"), the data is simply retrieved from the cache. Further, the cached information is kept for the benefit of downstream processing of subsequent patterns or form XObjects. Hence, the system improves the efficiency of the cache with better cache utilization, reduced processing overhead, and improved overall performance.

The system can convert composite PDF files into pre-separated PDF representation prior to sending the information to a RIP engine. ICC profiles and transformation mechanisms can be used for color conversion. The system can generate PDF to PDF separation which retains high level graphics information during the conversion process. The high level graphics information supports device independence. The determination of whether to draw other planes in the area of the graphic being converted is done efficiently. The system provides the capability of identifying plate 'aliases' indicating that all data for two or more individual colors are represented on a single plate. Further, the system references cached data to avoid storing duplicates, thus minimizing storage requirements.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 illustrates a basic workflow for preparing a document for hardcopy production.

FIG. 2 illustrates one exemplary document using an exemplary pattern.

FIG. 3 illustrates one exemplary document using exemplary form XObject.

FIG. 4 shows a diagram for handling color separation on an exemplary document.

FIG. 5 illustrates a process for performing color separation on patterns.

FIG. 6 illustrates a process for performing color separation on form XObjects.

FIG. 7 illustrates a computer system diagram for handling color separation.

FIG. 8 is a schematic illustration of a printer for rendering color-separated images onto a printing plate.

Like reference numbers and designations in the various drawings indicate like elements.

DETAILED DESCRIPTION

FIG. 1 illustrates a basic workflow for preparing a document for hardcopy production. First, a user or an operator generates a document or file in step 100. The file can be generated using any suitable document processing software such as In-Design, PhotoShop and Illustrator, all of which are available from Adobe Systems Incorporated (San Jose, Calif.).

The output generated by step 100 is formatted and saved as a PDF file (step 102). Next, the PDF file generated in step 102 is presented to a preflight module (step 104). The preflight module applies a set of rules specified by the user and scans the document to ensure that the PDF document conforms to that set of rules. If discrepancies exist, in certain cases, the preflight module is able to repair the file; in other cases, the preflight module prints a report and notes the errors to indicate to the user that further processing should be discontinued and that the user should return to the application that generated the file in order to repair the file.

After the preflight operation is performed, the workflow of FIG. 1 performs a scan/repair operation if needed and if possible (step 106). For example, the file may contain red green blue (RGB) color data and the production process may require cyan magenta yellow black (CMYK) color data. Step 106 may repair and convert the RGB data into CMYK data so that the production process can continue. The output of step 106 can loop back to step 100 to save the file, or can be presented to a service provider (step 108). The service provider may be able to handle errors where the automatic repair facilities in the preflight tool are unable to repair the document.

The output of the scan repair step 106 is a PDF file that is provided to a trim and bleed operation (step 112). The trim and bleed operation is an optional part of the workflow and allows the user to specify additional information about the boundaries of the document. The information may be used in subsequent document assembly steps. For example, to bind the document together by spiral binding or gluing the pages of a document together, the user can specify a boundary definition such that special marks can be placed on the page to indicate where a trim would occur. Other information can include a row of colors for calibrating printing devices to make sure that the colors are consistent and accurate. The output of step 114 is saved as a PDF file (step 116).

The PDF file of step 116 is then provided to a color converter (step 118). The color converter supports a conversion of color space information. For example, the user may have generated a document with an assumption of outputting the document to a particular vendor's image setter with certain color reproduction characteristics. If the document is then printed on a different device, the assumption is incorrect, but by understanding the nature of the first and second devices, step 118 can convert the color data so that the document is accurately is reproduced, regardless of the ultimate output device. The result of step 118 is saved as another PDF file (step 120).

The PDF file is then provided to an In-RIP trapping set-up step 122. A subsequent In-RIP trapping operation adds additional elements to the page to correct for the possibility of misalignment of elements printed by different printing plates and to ensure that the misalignment is not perceptible to a reader. Trapping refers to expanding or "spreading" regions of a particular color beyond its normal boundaries, and contracting or "choking" a color region, or both, to compensate for possible misregistration.

Next, the document is sent to a separation setup where the user can check the color information associated with the document (step 124). Step 124 also allows the user to modify the behavior of color separation as necessary. The output of the color separation processing can then be sent directly to an output device such as printer (step 126). Optionally, the user can preview the separation output using, for example, a viewer application tool that allows the user to see the results of the separation as a proofing process (step 127). During the separation preview operation, the user can generate a PDF file (step 128) or can print the document (step 129). The PDF file can then be imported (step 130) as an input to other processes such as printing or late-stage processing.

An input to the separation step is the selection of colorants, each of which will have a separation layer/color plate. These can selected automatically or by user input. Once that is determined, each page is decomposed into individual graphic elements. Each of these elements is examined to identify its associated color attributes. These color attributes may be represented as separation colors, DeviceN colors, composite device dependent colors or device independent colors. Separation colors and DeviceN colors are transferred directly onto associated representation of color plates after a conversion from a subtractive to an additive device gray color space. The composite colors are first converted into the target device color space.

When working with device independent colors, color characterization data described by the color definition is used to generate a source ICC profile. Alternatively, the PDF file can directly store the ICC profile. Device dependent color descriptions do not provide such data. As an alternative, users can specify a device characterization they assume is associated with the colorant data. Once an input characterization is created, an ICC transform is created in conjunction with the target device profile. Colors are converted using this transform and decomposed into the individual plates of data represented within the target composite space. New PDF objects are created for each plate and the associated color information is defined in terms of gray tint values.

A pattern or a form XObject is identified and the colors of the pattern or form XObject are separated dependent upon the color space of the target plates. Given a four component color space, the pattern or form XObject is separated into four distinct patterns or form XObjects, one for each colorant. Within a plate, objects to be painted with the original pattern or form XObject are now associated with the distinct representation for that plate. The following pseudo code describes the color separation process.

Identify color components of output document and characterization of output composite color space.

Generate pre-separated PDF document. The association between plates comprising a single composite page is described in a separation information dictionary.

For each graphical element on the page:

Check for form XObjects and Annotation objects here to see if they are associated with cached elements.

Find its color data and description of the associated color space

Check if associated color space is pattern and cached.
Check for previous instance in caches and reference the instance rather than proceeding with processing.

Convert color values to target device space or leave as custom color.

For each of the CMYK colorant values that are not equal to zero draw the object onto the PDF representation of the plate.

Examine overprint settings and determine which if any plates will be drawn with an additional knockout element.

Convert individual grayscale object streams into page contents and write pages.

The process of gathering associated color information for an object differs based on the type of object. Graphical elements in a PDF files can be divided into the following general categories: text, vector art, images, smooth shades, forms and annotations. Text and vector art, while differing in other attributes, each reference color definitions for stroke and fill colors.

The system performs color separation for the contents of either patterns or form XObjects, as described in the PDF Reference Manual discussed above. FIG. 2 shows an example of a pattern 140 which is referenced by one or more items in a page or outer context 146 in which the pattern 140 is used. Items 142 and 144 are two usages of the pattern on the page. Item 142 is a triangle whose geometry cuts out part of the pattern so all that is visible is the part of the pattern that would appear within the triangle. Item 144 is a circle which is larger than the pattern itself which, in this example, happens to be a tiling pattern such that the pattern 140 is replicated multiple times and reused to fill up the entire circle.

In a second embodiment, the system performs separation of form XObjects. As shown in FIG. 3, a form XObject 150 is referenced by two graphical items 152 and 154. The graphical items 152 and 154 are embedded in an outer context or page content 156. The items 152 and 154 are shown with lines referring to the form 150. The form 150 in this case is used twice on the page. The form 150 appears in its entirety on the page because the form itself describes the geometry and the bounds to be drawn.

The system optimizes a process for creating color separation for a document with a graphical container using a cache by creating a high-level representation of the container as a separated element in the cache; and using the separated element in the cache when the graphical container is invoked a second time. The high-level representation includes non-bitmapped representations such as device independent representations or vector representations. More details on the processes of separating colors for patterns and form XObjects will be discussed next.

Color Separation for Patterns

A pattern is a container of one or more graphical elements. During the separation process, the pattern is decomposed into its underlying elements. The process walks through the container, identifies all objects in that container and performs color separation for each object. The color separation essentially generates a gray scale representation for each colorant of each object. Thus, a CMYK color separation generates four gray scale plates for one of each colorant of the CMYK color space.

The content of each pattern for each colorant is then associated and reconstructed as a pattern object in memory to create streams of grayscale data. When reconstructed as a pattern, objects are grouped together and represented in a predetermined syntax, such as the PDF syntax for the pattern.

FIG. 4 shows a diagram 200 for handling color separation on an exemplary document 202. The document 202 represents the content of a single page (outer context) and includes graphical items 204, 206 and 208 associated with the page. Items 204 and 206 share a common pattern which is defined in a pattern container 210 (inner context). Thus, rather than having the graphical content of the pattern container 210 appear in-line in the page description, items 204 and 206 each reference the pattern container 210. The container 210 includes a circle and a T character 212, both of which are overlaid by a hatching pattern.

The document 202 is separated into 202C, 202M, 202Y and 202K respectively corresponding to the separation colorants cyan magenta yellow and black. In one implementation, each of these plates 202C, 202M, 202Y and 202K is represented in grayscale and plate association relationship is stored in a separation dictionary 210.

In this example, the black plate 202K contains nothing and therefore no pattern representation is needed. Further, the pattern (inner context) 210 is also color-separated to generate patterns 210C, 210M, 210Y, and in this example, nothing for the black pattern.

The cyan plate 210C shows that only certain components of the document 202, namely items 204C and 206C reciting a cyan pattern 210C with closely spaced cross hatches, are present in the cyan color printing process. Thus, only items 204C and 206C appear on the cyan plate 202C. Similarly, for the magenta color plate 202M, items 204M and 206M recite a magenta pattern 210M with widely-spaced cross-hatches. The yellow color plate 202Y contains items 204Y and 206Y, both of which recite a yellow pattern 210Y with an exemplary T character.

As shown in FIG. 5, a process 230 performs color separation for patterns associated with a document. First, when a document is first received, a pattern cache is created and initialized as an empty list of cached patterns for each process or custom color plate (step 232). The cache can simply accept every entry without pruning. For systems with limited memory resources, the pattern cache may use a least recently used (LRU) method, among others. In LRU, a list of objects such as patterns or form XObjects is maintained in the cache and is ordered based on aging: the most recently accessed object is the first in the list, while the least recently accessed object is at the bottom as candidates for pruning. When a new object is accessed, one or more objects may have to be pruned from the list to make room in the cache for the most recently accessed object.

The process 230 then creates a new separation context to capture the separated pattern components (step 234). The new separation context captures information that needs to be tracked in order to perform the separation processing. The information includes intermediate state information metadata about the current stage of processing. In one implementation, the information is saved in a new set of variables associated with a container for the pattern components. The separation context is the set of elements that records the current state of the processing, for instance, the pattern of the sequence and the object currently being processed. Pseudocode for step 234 is shown below:

At the first usage of the given pattern a new separation context is created to capture the separated pattern components.
        Identify default colorspaces associated with the pattern. If they exist, push them onto the default colorspaces stack.
        For each process and custom color plate do the following:
        Create a container for the content which includes ID of pattern, object count, content type=kPDEPattern and a content stream.
        Call PDEContentCreate( ) facility provided by PDFEdit to initialize the content stream.

Next, the pattern is decomposed into its underlying elements and each of the elements is run through the separation process, which can be recursive (step 236). The contents of pattern associated with each individual plate are then reconstructed as pattern objects (step 238). Pseudo-code for this step is shown below:

For each process and custom color plate do the following:
    Use PDEContentToCosObj( ) facility provided by PDFEdit to create a PDF Syntax representation of the memory based stream.
    Set the content type to kPDEPattern (value is 0xD), pattern type to 1 and paint type to 1.
    Copy all resources created by PDEContentToCosObj( ) into pattern stream attributes dictionary.
    Copy the TilingType, xStep and yStep and bounding box attributes from composite pattern definition.
    If there was a transformation matrix associated with the composite pattern copy it to the separated pattern.
    Separate color for contained elements.
    If the separated pattern contained any elements on the given plate:
    Call CosNewArray( ) to create a new color space definition. Define it as type pattern.
    Create a PDEColorSpec structure associating the new color space array with the new pattern dictionary object. The dictionary object was created by calling PDEPatternCreate( ) on the new contents.

When returning to the outer context, the individual patterns are both associated with the object and placed in the cache for the individual plate (step 240). Pseudo-code for step 240 follows:

For each process or custom color plate where a separated pattern stream exists:
    Create a new slot in the associated pattern cache
    Store the PDEColorSpec into the cache associated with individual plate. Cache access key is the CosObj number of the composite pattern.
    Create a new graphical element in the plate (outer context) whose color space information references the separated color space.

When subsequent objects are drawn with the same pattern, the cached representation for each plate is looked up and associated with the subsequent object. The look-up operation is more efficient than reprocessing the objects, and is shown in pseudo code below.

For each process or custom color plate use the IndexOf( ) method of the pattern cache object to determine if a separated representation of the pattern exists. Return "true" if it does.
    If none of the process or custom color plates returned "true" above, the pattern has not been separated before. At this point proceed with Step 234 which will create the items to be cached.
    Otherwise, for each process or custom color plate obtain the cached representation of the separated pattern using the IsCachedContent( ) call associated with the pattern cache.
    Create a new graphical element in the plate whose color space information references the separated color space.

During operation, while performing color separation on objects within a document an object which is drawn with a colored pattern may be encountered. The following operations are performed:

Call PDEContentGetNumElems( ) to obtain the number of graphical elements on each page in the composite document.
    For a count of 1 to the number of elements obtained above, obtain the associated graphical element by calling PDEContentGetElem( ).
    Identify the type of element using the PDEObjectGetType( ) call.
    Obtain the colorspace information associated with a given object by calling PDEElementGetGState( ). Colorspaces are stored as components of the fill or stroke color specifications.
    Call PDEColorSpaceGetName( ) to determine if the element in question has the name "Pattern". Check caches: if not cached, then go to step 234.

The operation of the process 230 (FIG. 5) on the exemplary document 202 (FIG. 4) is discussed next. First, when the document 202 is first received, the pattern cache is created and initialized. The initialization of the pattern cache essentially creates an empty list of cached patterns for each process or custom color plate.

The cache is then searched. For the first item encountered, in this example the item 204, a cache miss occurs. A new separation context is created to capture information that needs to be tracked in order to perform the separation processing. The pattern 210 associated with the item 204 is processed and submitted to each plate cache so that references from the various page contents can be pointed to the cached pattern.

The next item 208 is then fetched. The above operations are used to determine that the item 208 does not reference a pattern color space. Hence, the cache is not searched. Next, the item 206 is encountered. Rather than immediately processing the pattern for the item 206, the cache is searched for an occurrence of any of the 210C pattern, the 210M pattern, the 210Y pattern or the 210K pattern. If any one of those exists, a pattern cache hit occurs and instead of reprocessing when the item 206 is written to a buffer representing the individual plates, only the item 206 and a reference to its cached pattern are written to the buffer. Thus, by caching the patterns, performance is increased.

Color Separation for Form XObjects

FIG. 6 shows one embodiment of a process 330 for performing color separation for form XObjects associated with a document. First, when a document is first received, a form XObject cache is created and initialized as an empty list of cached form XObjects for each process or custom color plate (step 332). The cache is searched, and if a cache miss occurs, the process 330 creates a new separation context to capture the separated form XObject components (step 334). The new separation context captures information that needs to be tracked in order to perform the separation processing. Pseudo-code for step 334 is shown below:

At the first usage of a form XObject, a new separation context is created to capture the separated form XObject components.

Identify default colorspaces associated with the composite form XObject. If they exist, push them onto the default colorspaces stack.

For each process and custom color plate do the following:

Create a container for the content which includes ID of form XObject, object count, content type=kPDEForm and a content stream.

Call PDEContentCreate( ) facility provided by PDFEdit to initialize the content stream.

Next, the form XObject is decomposed into its underlying elements and each of the elements is run through the separation process, which can be recursive (step 336). The contents of form XObject associated with each individual plate are then reconstructed as a form XObject (step 338). Pseudo-code for this step is shown below:

For each process and custom color plate:

Use PDEContentToCosObj( ) facility provided by PDFEdit to create a PDF Syntax representation of the memory based stream.

Use PDEFormCreateFromCosObj( ) call to create the separated representation of the form. Pass in the transformation matrix attribute from the composite form so that it is copied to the separated version.

When returning to the outer context, the individual form XObjects are both referenced by the page content and placed in the cache for the individual plate (step 340). Pseudo-code for step 340 is as follows:

For each process or custom color plate where a separated form XObject stream exists:

Create a new slot in the associated form XObject cache

Store the form PDEElement into the cache associated with individual plate. Cache access key is the CosObj number of the composite form XObject.

Submit a reference to the separated form PDEElement to the contents stream.

When subsequent objects are drawn with the same form XObject, the cached representation for each plate is looked up and associated with the subsequent object. The look-up operation is more efficient than reprocessing the objects. Pseudo-code is as follows:

For each process or custom color plate use the IndexOf ( ) method of the form XObject cache object to determine if a separated representation of the form XObject exists. Return "true" if it does.

If none of the process or custom color plates returned "true" above, the form XObject has not been separated before. At this point creates the items to be cached.

Otherwise, for each process or custom color plate obtain the cached representation of the separated form XObject using the IsCachedContent( ) call associated with the form XObject cache.

Submit a reference to the separated form PDEElement to the contents stream.

During operation, while performing color separation on objects within a document, if an object having the type of form XObject is encountered, the following steps occur:

Call PDEContentGetNumElems( ) to obtain the number of graphical elements on each page in the composite document.

For a count of 1 to the number of elements obtained above, obtain the associated graphical element by calling PDEContentGetElem( ).

Identify the type of element using the PDEObjectGetType( ) call.

If the type is kPDEForm (in one embodiment a value of 4), go to step 336.

The operation of the process of FIG. 6 on a document such as the document of FIG. 3 will be discussed next. In FIG. 3, an arrow from the item 150 is pointed at the form XObject to indicate that the item 152 refers to the form XObject 150. Likewise, an arrow from the item 154 to the form XObject 150 indicates that the item 154 refers to the form XObject 150. During processing, the process of FIG. 6 examines the outer context and determines that the first item to be drawn on a page is the form XObject 150. The process then performs color separation for the item. In the next iteration, the system comes back to the outer context and determines that the next item on the page is also a form XObject 150. The system first looks in its cache for an occurrence of a form XObject 150 and, since the form XObject 150 is cached, the system can simply make a reference to the cached copy.

The system can also construct a new PDF document that contains a single PDF page for each of the color components comprising the composite page. In this new document, each of the component pages is described using only tints of gray color. The manipulation of the document includes both color conversion to the destination color space and decomposition of color information into individual color components.

The user specifies the color components which will form the resulting document. This selection is all or a subset of the colors used by the target output device plus any custom colors specified by the composite document. Once that is determined, each page is decomposed into individual graphic elements. Each of these elements is examined to identify its associated color attributes. These color attributes may be represented as custom colors, DeviceN colors, composite device dependent colors or device independent colors. Custom colors and DeviceN colors are transfer directly onto the associated plates after a conversion from subtractive to additive device gray color space. Composite colors are first converted into the target device color space.

When working with device independent colors, color characterization data described by the color definition is used to generate a source ICC profile. Device dependent color descriptions do not provide such data. As an alternative users can specify a device characterization associated with the colorant data. Once an input characterization is created, an ICC transform is created in conjunction with the target device profile. Colors are converted using this transform and decomposed into the individual plates of data represented within the target composite space. New PDF objects are created for each plate and the associated color information is defined in terms of gray tint values.

The process of gathering associated color information for an object differs based on the object type. Graphical elements in a PDF files can be divided into the following general categories: text, vector art, images, smooth shades, forms and annotations. Text and vector art, while differing in other attributes, each reference color definitions for stroke and fill colors. During the color separation, the stroke and filled optimization are preserved rather than generating two distinct objects in this case. Images include raster data which contains colorant values for individual pixels within the image description itself. The separation process in turn finds the color space information associated with the image data in order to correctly interpret the pixel values.

Smooth shades come in a variety of definitions. Each of these defines fill colors to be used at the end point of interpolation. In some cases this is a single value with an associated function. In other cases, a distinct color exists for each point on a mesh.

Forms and annotations are treated fundamentally as containers for multiple primitive objects. Processing of these constructs is optimized by the use of caches which allows them to be processed once and subsequently referenced from the cache. Embodiments of code for processing these constructs, whose outputs may be cached, are discussed below.

Pseudo code for color conversion of device dependent composite colors is as follows:
  User must identify input characterization profile to be associated with the colorant definition
  Input profile is generated from (or used) the user's selection and associated with the output device profile to create an ICC transform
  Colorant values are processed through this transform and stored in possibly non-contiguous (planar) locations.

Pseudo code for color conversion of device independent composite colors is as follows:
  Input color characterization is obtained from parameters of color space definition. If it is not an embedded ICC profile, one is generated from the parameter set.
  Input profile is associated with the output device profile to create an ICC transform
  Colorant values are processed through this transform and stored in possibly non-contiguous (planar) locations.

Pseudo code for color conversion for custom colors is as follows:
  In general custom colors can be transferred to the resulting document after simply transforming the colorant value to an additive color space.
  When the user has chosen to convert such colors to the process model (i.e., print them without special inks) the composite color representation is determined through application of the tint transform procedure.
  A tint transform procedure can be obtained from either the custom color definition or as a linear interpolation from a "%%CustomColor:" DSC (PostScript Document Structuring Convention) comment
  If the resulting color space of the tint transform does not match the device color space, it must be further transformed through the process described in color conversion of composite colors.

Pseudo code for performing color conversion for DeviceN colors is as follows:
  In general DeviceN color descriptions can be decomposed into component custom colors and transformed to an additive color space during the separation process.
  When the user has chosen to convert such colors to the process color model the color representation is determined through application of the tint transform procedure.
  A tint transform procedure can be obtained from the DeviceN color definition.
  If the resulting color space of the tint transform does not match the device space, it must be further transformed through the process described in color conversion of process colors.

Pseudo code for determining colors associated with text is as follows:
  Stroke and fill color text parameters are associated with each segment of text.
  The color space characterization of these colors is referenced as part of the stroke or fill definition
  The separation process must deal with any combination of stroke and fill colors. The resulting grayscale definitions try to preserve stroke and fill combinations where both appear in a single plate.

Pseudo code for determining colors associated with vector art is as follows:
  Stroke and fill color path parameters are associated with each element of vector art.
  The color space characterization of these colors is reference as part of the stroke or fill definition
  The separation process must deal with any combination of stroke and fill colors. The resulting grayscale definitions try to preserve stroke and fill combinations where both appear in a single plate.

Pseudo code for determining colors associated with Images is as follows:
  The colorant values are stored as the actual content of the raster data stream.
  The color space characterization is a parameter specified in the image characteristics dictionary. It describes how the data stream should be interpreted.
  The separation process generates each stream of resultant colorant values in contiguous order.

This contrasts with interleaving components of the composite color. Pseudocode for determining of colors associated with smooth shades is as follows:
  Colors associated with a smooth shade are found either a parameters to the function shading dictionary. In this case it is only necessary to transform and separate that color data.
  Colors associated with smooth shading mesh type are found associated with each and every point on the mesh. A special algorithm describes mechanism be which the separation strategy is determined. Sometimes each colorant value will be converted and sometimes are raster image approximation will be generated as a replacement. A raster image replacement is necessary when transformation to device space will result in significant and inconsistent hue shifts.

Pseudo code for determination of colors associated with uncolored patterns:
  As the name suggests an uncolored pattern contains no color information itself.
  Instead the separation algorithm must examine the fill color of the associated graphical element.
  The fill color will be transformed and the separated object will again be generated a filled with an uncolored pattern.

Pseudo code for the determination of colors associated with container (patterns, forms, annotations) objects is as follows:
  Each container object can be viewed as a holder of primitive graphic elements. There is not a color associated with the container itself.
  The individual elements comprising the container are separated as mentioned with the primitive type algorithms.
  A new container of grayscale data is created for each of the resulting plates.

After the user sets up the separations, the user may invoke a Preview window. The preview window is a color-matched soft proof of the document. In one implementation, the preview window displays overprint settings and transfer curves, and reflects any color profiles the end user specifies. Overprint settings support Adobe Illustrator and PostScript conventions. The user examines the plates in the preview window using, as navigational tools, scroll bars (horizontal and vertical), window resize controls, Page Up and Page Down controls, and a zoom level indicator. The viewing tool palette consists of zoom, measure, and densitometer (eye dropper) tools, and a list of buttons (one per generated plate) controlling whether that plate will be shown in the preview window. Further, a magnifying glass button selects the zoom tool for changing the zoom level of the preview window. The ruler button selects the measure tool. When the end user clicks two locations in the preview window, a mini-window pops up displaying the delta-x, delta-y, and angle between the locations. When the densitometer tool is active, the end user can click anywhere in the preview window and display, in the color plate list, the percentage of colorant in each plate for the selected pixel.

For the purposes of viewing, the end user has a number of controls. In one embodiment, a color plates list allows the user the ability to show or hide color plates. When multiple plates are viewed, each is shown in printing ink color. Further, the user can view one color plate in a grayscale representation.

In another embodiment, the preview window allows the user the following options:
Ability to page through the separated document based on page numbering of the composite document.
Ability to measure the distance between two points in the preview window in the units specified in Preferences.
Ability to measure the neutral density of the ink for any pixel in the preview window.
Ability to zoom in or out of the preview image contents specified in percentages of the screen resolution (that is, 50%, 100%, and so forth).
Ability to view the contents of boxes specified in Preferences.
Ability to view printer's marks added as part of setup.
Ability to determine the page dimensions of the preview page.

In another embodiment, a Preview dialog has buttons allowing the user the ability to save a composite of the entire document using the Save As button; to print the actual separations to the current output device using the Print button; and to close the dialog for the current session using the Done button. The user can invoke an Acrobat Print dialog from the Print command in a File menu, a Print button on a Setup dialog, or a Print button on the Preview dialog. From the Print dialog, the user can print to the current output device as a composite document or can print host-based separations, one separation per page.

The process of FIGS. 1-6 are executed by a computer system. FIG. 7 illustrates one such computer system 600, including a CPU 610, a RAM 620, and an I/O controller 630 coupled by a CPU bus 640. The I/O controller 630 is also coupled by an I/O bus 650 to input devices such as a keyboard 660 and a mouse 670, and output devices such as a monitor 680.

FIG. 8 shows a typical printer driven by the computer system 600. Referring to FIG. 8, a printer embodying the invention includes an input/output (I/O) interface 730 for receiving page description language commands over a cable or network from the host computer which outputs page description language commands to the common bus 734. Error messages and control information relating to the transfer of data is communicated back to the host via the I/O interface 730. As each page description language command is received, it is stored in random access memory (RAM) 732 over the common bus 734. A microprocessor 736 on the common bus 734 provides the computation and control for generating raster data and supplying the raster data to the print engine controller 738, which in turn passes the raster data to the electromechanical print engine 740 that applies the image to paper.

The program for the microprocessor 736 is permanently stored in a read-only memory (ROM) 742. Input data, intermediate results including the intermediate page representations, the raster buffer data for the current decompressed strip to be sent to the print engine controller and all other variable data are stored in shared RAM 732.

The microprocessor 736, ROM 742, RAM 732 and common bus 734 work together as a raster generator to convert the input page description language commands to raster data driving print engine controller 738. A standard commercial microprocessor, such as the Motorola 68000 family or the Intel i960 family may be used as the microprocessor 736. The RAM 732 is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A computer program product, encoded on a computer-readable medium, for generating a pre-separated file for color separation operations, the program operable to cause data processing apparatus to perform operations comprising:
creating a high-level representation of a graphical container as a separated element the first time a graphical container is used, the high-level representation being a non-bitmapped representation;
storing the high-level representation of the graphical container in memory; and
referring to the separated element in memory when the graphical container is invoked a second time.

2. A system for generating a pre-separated file for color separation operations, comprising:
means for creating a high-level representation of a graphical container as a separated element the first time a graphical container is used, the high-level representation being a non-bitmapped representation;

means for storing the high-level representation of the graphical container in memory; and means for referring to the separated element in memory when the graphical container is invoked a second time.

3. A computer program product, encoded on a computer-readable medium, for creating color separation for a document with a pattern container using a cache, the program operable to cause data processing apparatus to perform operations comprising:

creating a high-level representation of the pattern container as a separated element in the cache, the high-level representation being a non-bitmapped representation; and using the separated element in the cache when the pattern container is invoked a second time.

4. A system comprising:

a cache;

means for creating a high-level representation of the pattern container as a separated element in the cache, the high-level representation being a non-bitmapped representation; and means for using the separated element in the cache when the pattern container is invoked a second time.

5. A computer program product, encoded on a computer-readable medium, for creating color separation for a document with a form XObject using a cache, the program operable to cause data processing apparatus to perform operations comprising:

creating a high-level representation of the form XObject as a separated element in the cache, the high-level representation being a non-bitmapped representation; and using the separated element in the cache when the form XObject is invoked a second time.

6. A system comprising:

a cache;

means for creating a high-level representation of the form XObject as a separated element in the cache, the high-level representation being a non-bitmapped representation; and means for using the separated element in the cache when the form XObject is invoked a second time.

* * * * *

UNITED STATES PATENT AND TRADEMARK OFFICE
CERTIFICATE OF CORRECTION

PATENT NO.        : 7,379,209 B1                           Page 1 of 1
APPLICATION NO.   : 11/623735
DATED             : May 27, 2008
INVENTOR(S)       : Michelle R. Dalton It is certified that error appears in the above-identified patent and that said Letters Patent is hereby corrected as shown below:

On the Title Page - (*) NOTICE:
    left column, line 13:
        insert --This application is subject to a terminal disclaimer.--

On the Title Page - (56) REFERENCES CITED:
    right column, line 5:
        delete "355/251", and replace with --399/231--

Signed and Sealed this

Seventeenth Day of March, 2009

JOHN DOLL
*Acting Director of the United States Patent and Trademark Office*